Patented Sept. 19, 1922.

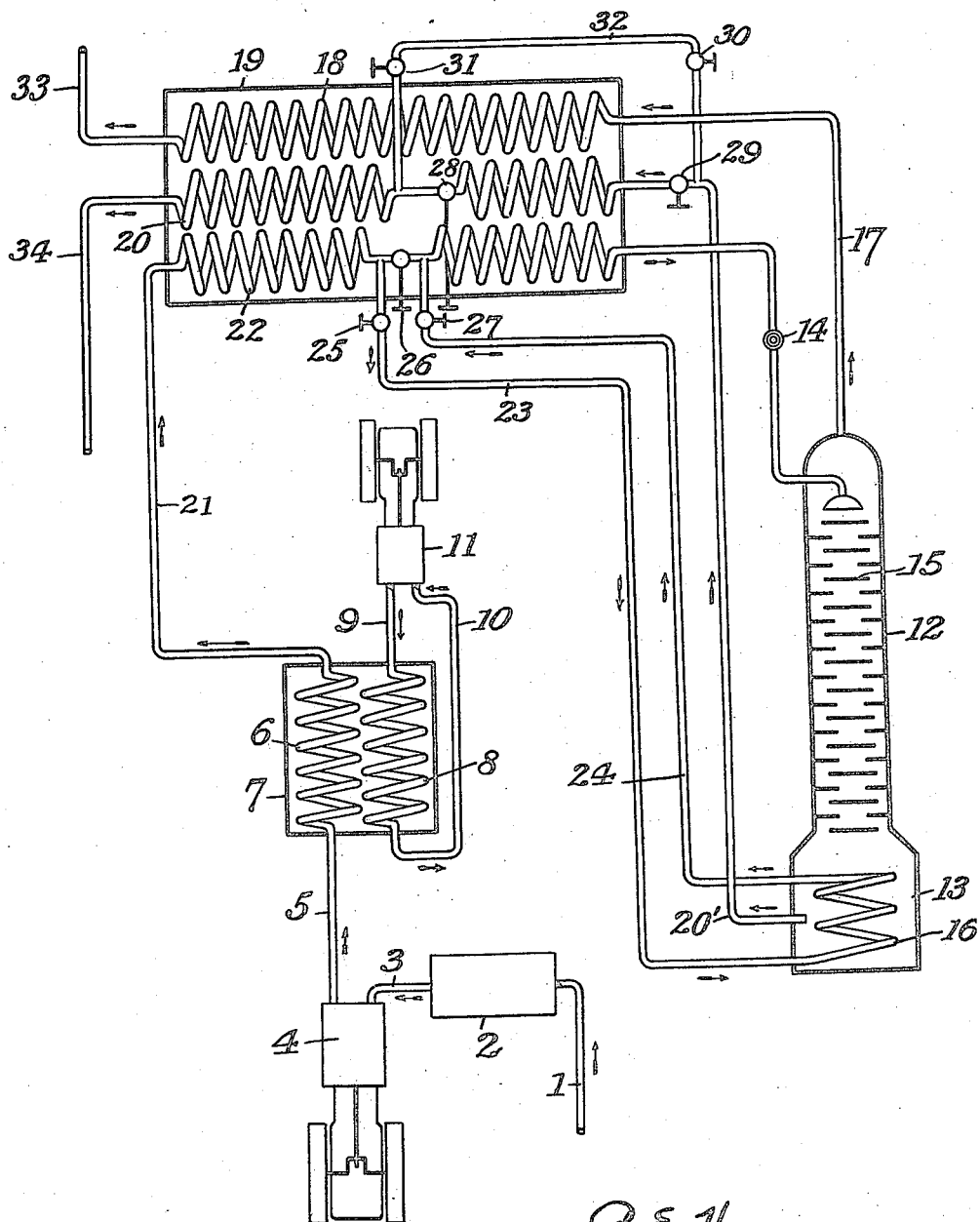

1,429,903

UNITED STATES PATENT OFFICE.

PIERRE E. HAYNES, OF BUFFALO, NEW YORK, ASSIGNOR TO THE LINDE AIR PRODUCTS COMPANY, OF NEW YORK, N. Y., A CORPORATION OF OHIO.

APPARATUS FOR THE SEPARATION OF GASEOUS MIXTURES.

Application filed April 12, 1919. Serial No. 289,594.

*To all whom it may concern:*

Be it known that I, PIERRE E. HAYNES, a citizen of the United States, residing at Buffalo, in the county of Erie and State of New York, have invented certain new and useful Improvements in Apparatus for the Separation of Gaseous Mixtures, of which the following is a full, clear, and exact description.

The production of low temperatures is greatly facilitated by the use of heat-exchangers permitting cold gases or liquids, which have already been used as refrigerants, to take up heat from liquids or compressed gases which are later to be liquefied or used as refrigerants. The adoption of this principle has made possible the liquefaction and separation of gases which cannot be liquefied by pressure alone at ordinary temperatures.

The separation of certain gaseous mixtures is best effected by the aid of rectifying columns in which considerable difference of temperature exists between the warmest and coldest points. In such a column the liquefied gas is delivered to the column at a relatively cold point and descends to the bottom where it is collected in a suitable kettle. The compressed gas, or liquefied gas, as the case may be, before delivery into the column is passed through a coil submerged in the collected liquid and warms the same, causing evaporation of more or less of the liquid and hence causing the escape therefrom of any gases of lower boiling points that may be present therein. At the same time the aforesaid compressed gas or liquefied gas is itself cooled in passing through the coil. The gases and vapors liberated from the collected liquid rising in the column meet the cold liquid descending therein and the vapor or gas of higher boiling point is condensed, falling to the bottom of the column where it is added to the liquid submerging the aforesaid coil (which liquid may be conveniently termed the liquid product of separation), while the vapors or gases of lower boiling points (constituting the gaseous or uncondensed products of separation) escape from the column at the top and are led through a heat-exchanger. At the same time the liquid product of separation collected in the kettle is continually withdrawn and led through the heat-exchanger in the same direction as the uncondensed gases or vapors just mentioned. Before the compressed gas is delivered to the submerged coil it is passed through the heat-exchanger coil in countercurrent relation to the cold gas and liquid flowing therethrough.

My present invention relates to the process thus briefly outlined, and its chief object is to lead the compressed gas or liquid through the coil submerged in the liquid product of separation in the kettle at a temperature which will effectively evaporate the latter liquid, preferably by causing active boiling of the same, and yet deliver the compressed gas to the column at a temperature lower than that at which it leaves the aforesaid boiling coil, without the use of any additional refrigerant. The efficiency of the process is thus increased, by utilizing the temperatures which are most effective for the various purposes. To this and other ends the present invention consists in the novel apparatus hereinafter described.

The accompanying drawing illustrates diagrammatically a simple form of apparatus for practising the invention.

For the purpose of simplifying the description it is assumed that we have a mixture of two gases, A and B, which it is desired to separate, and that gas A has the higher boiling point. It is to be understood that this assumption of a gaseous mixture having only two components is merely illustrative, and that the invention is applicable as well to mixtures having a greater number of components.

The gas AB is drawn from a suitable source through pipe 1, and, if necessary or desirable, through a suitable purifier indicated at 2, by which the deleterious impurities may be removed. Thence the gas passes through pipe 3 to compressor 4 by which it is compressed to a suitable pressure and delivered through pipe 5 to coil 6 of a precooler 7 where it is cooled (giving up at least its heat of compression) by a convenient refrigerant which is circulated through coil 8 and pipes 9 and 10 by a refrigerating machine 11.

The rectifying column 12 has a receptacle or "kettle" 13 at its lower end. The cold compressed gas AB is expanded into the column at the top through valve 14 and is partially liquefied, the liquid descending over the plates 15 and collecting in kettle 13 around the boiling coil 16, while the uncondensed portion of the mixture escapes through pipe 17. The kettle thus contains a liquefied gas A (which has the higher boiling point and hence liquefies more easily), with more or less of gas B in liquid form or as a dissolved gas, but gas B and more or less of gas A are driven off by the boiling. The resulting vapors rising in the column are again cooled, this time by the descending liquid, and the vapor A is condensed, falling to kettle 13, while vapor B escapes at the top of the column and is led by pipe 17 to coil 18 of the heat-exchanger 19. The liquid descending in the column is warmed by the ascending vapors, and any liquefied gas B is evaporated, and escapes through pipe 17 to the heat-exchanger. Eventually the liquid collecting in kettle 13 is substantially free from gas B.

Liquefied gas A, rectified as described above, is continuously withdrawn from the kettle by pipe 20' and passed to coil 20 of the heat-exchanger, through which it flows in the same direction as the uncondensed product or products of separation in coil 18.

From coil 6 of the precooler 7 the gas AB is carried through pipe 21 to coil or conduit 22 of the heat-exchanger, and is cooled by the gas B and liquid A flowing countercurrent in coils 18 and 20 respectively. From coil 22 the gas AB passes to the expansion valve 14 for delivery to the rectifying column 12 as already described.

It will be seen that the purpose of the conduit or coil 16, in kettle 13, is twofold: first, to cool the gas AB before the same is delivered to the expansion valve; and second, to warm the liquid in the kettle and by the resulting evaporation drive off any gas B that may be mixed with or dissolved in the liquid. Heretofore the practise has been to lead the gas AB from the cold end of the heat-exchanger to the coil 16 and thence directly to the expansion valve, the gas receiving its final cooling (before expansion) in the coil 16. But in some cases the temperature of the gas in the coil just mentioned must be (relatively) so high, in order to produce proper evaporation of the liquid in the kettle, that it is not cooled thereby to a temperature low enough for efficient liquefaction at the expansion valve and for the consequent production of the desired low temperature in the top of the column. On the other hand, if the refrigerating capacity or effect of the heat-exchanger is increased, so that the gas will reach the expansion valve at the most efficient temperature, the gas when it reaches coil 16 may be too cold to produce the desired boiling of the liquid in the kettle. In such case it has been necessary to apply heat from an external source to the kettle, with consequent loss of efficiency of the refrigeration cycle. Accordingly it has been proposed to make a compromise: delivering the gas to the boiling coil at a temperature lower, and to the expansion valve at a temperature higher, than the most efficient operation would require; adjusting the two factors so as to obtain the best economy possible under the circumstances, but nevertheless involving considerable loss.

It has also been proposed to pass the separated gases through a heat-exchanger in counter-current to the compressed mixture, and to so reduce the efficiency of the heat-exchanger that the compressed mixture is discharged therefrom at a temperature which is not too low to produce proper evaporation of the liquefied mixture. Since the mixture leaving the coil used for this evaporating step is ordinarily not sufficiently cold to be passed to the expansion valve, a further cooling is desirable and this has been effected, in the proposal referred to, by the use of an independent cooling medium, circulating in a closed cycle. Power is of course consumed in this cycle while the refrigerating capabilities of the separated gases leaving the initial heat-exchanger are not exhausted, and the gases are discharged at a low temperature. For this reason, such a process is inefficient.

By means of my invention the losses inherent in the processes described above can be eliminated. For this purpose the heat-exchanger conduit or coil 22 is divided, at a point at which the compressed mixture flowing therethrough still has a temperature high enough to boil the liquid in the kettle efficiently, and from the first portion of the coil the mixture is led, as by means of pipe 23, to the boiling coil 16. There the mixture is cooled down to a temperature more or less near that of the liquid being boiled. From the boiling coil the mixture is brought back through pipe 24 to heat-exchanger and passed through the remaining portion of coil 22, where it is reduced to the temperature desired for delivery to the expansion valve.

It will thus be seen that by my improvement it is possible to obtain an efficient utilization of the refrigerating value of the expanded and liquefied gas or gases and at the same time obtain a clean isolation of the component which it is desired to to separate from the original mixture.

Valves 25, 26, 27 may be provided in pipes 23 and 24 and coil 22, so that if desired a part of the mixture flowing through coil 22 may be passed directly to the expansion valve, or the flow through coil 16 cut off entirely, as may be desirable. If, as is usually the case, it is not desired to permit exchange of temperature between the compressed mixture after it has passed, the coil 16, and the rectified liquid flowing countercurrent in the coil 20, the valves 28 and 29 in coil 20 may be closed and valves 30 and 31 opened in the by-pass 32, thus delivering the liquid to the heat-exchanger at an intermediate point, for example beyond the outlet of pipe 24, which outlet is preferably close to the inlet of pipe 23. In this way the compressed mixture will not be reduced to so low a temperature before the delivery to the expansion valve.

From coils 18 and 20 of the heat-exchanger the separated constituents of the original mixture are led by pipes 33 and 34 respectively to different points of utilization or to separate vessels, as may be desired.

It is to be understood that the invention is not limited to the details herein specifically described, but can be embodied in other forms without departure from its spirit as defined by the following claims. The process described is not claimed herein but will be made the subject of a separate application.

I claim:

1. In apparatus for fractionating gas mixtures by a process involving liquefaction of at least a part of the mixture, a gas compressor, an expansion nozzle, a receptacle adapted to collect liquid issuing from or formed at said expansion nozzle, a heater for said receptable, a conduit connecting the compressor to the heater, a conduit connecting the heater to the expansion nozzle, a cooler in said latter conduit, and means for leading gases which have passed said expansion nozzle to said cooler.

2. In apparatus for fractionating gas mixture by a process involving liquefaction of at least a part of the mixture, a gas compressor, an expansion nozzle, a receptacle adapted to collect liquid issuing from or formed at said expansion nozzle, a heater for said receptacle, a conduit connecting the compressor to the heater, a first cooler in said conduit adapted to be refrigerated by gases which have passed the expansion nozzle, a conduit connecting the heater to the expansion nozzle, a second cooler in said latter conduit, and means for leading gases which have passed said expansion nozzle to said second cooler.

3. In apparatus for fractionating gas mixtures by a process involving the liquefaction of at least a part of the mixture, a gas compressor, an expansion nozzle, a receptacle adapted to collect liquid issuing from or formed at said expansion nozzle, a heater for said receptacle, a conduit connecting the compressor to the heater, a first cooler in said conduit adapted to be refrigerated by gases which have passed the expansion nozzle, a conduit connecting the heater to the expansion nozzle, a second cooler in said latter conduit, means for leading gases which have passed said expansion nozzle to said second cooler, and controllable means for by-passing the heater, whereby any desired proportion of the gases leaving the first cooler may be passed to the second cooler without traversing the heater.

In testimony whereof I hereunto affix my signature.

PIERRE E. HAYNES.